(12) United States Patent
Jeromson et al.

(10) Patent No.: US 7,261,126 B2
(45) Date of Patent: Aug. 28, 2007

(54) CONTROL VALVE

(75) Inventors: Peter James Jeromson, Auckland (NZ); James Raymond Bilyard, Auckland (NZ); David John Parkinson, Auckland (NZ)

(73) Assignee: Emech Control Limited, Auckland (NZ)

( * ) Notice: Subject to any disclaimer, the term of this patent is extended or adjusted under 35 U.S.C. 154(b) by 254 days.

(21) Appl. No.: 11/060,311

(22) Filed: Feb. 18, 2005

(65) Prior Publication Data
US 2005/0194053 A1 Sep. 8, 2005

(30) Foreign Application Priority Data
Feb. 18, 2004 (NZ) .................................... 531222

(51) Int. Cl.
*F16K 11/06* (2006.01)
(52) U.S. Cl. ......................... 137/625.41; 137/625.46; 251/304
(58) Field of Classification Search ............. 137/625.4, 137/625.41 I, 625.46 X; 251/175, 304 X, 251/309
See application file for complete search history.

(56) References Cited

U.S. PATENT DOCUMENTS

| | | | |
|---|---|---|---|
| 2,907,349 A | 10/1959 | White | |
| 3,122,167 A | 2/1964 | Wadey | |
| 3,207,180 A | 9/1965 | Mercier | |
| 3,590,872 A * | 7/1971 | Baity | 137/625.46 |
| 3,768,516 A * | 10/1973 | Cyphelly | 137/625.46 |
| 4,058,289 A * | 11/1977 | Hicks | 251/304 |
| 4,205,821 A * | 6/1980 | Cyphelly | 137/625.46 |
| 4,754,783 A * | 7/1988 | Knapp | 137/625.4 |
| 5,219,148 A * | 6/1993 | Weyand | 251/175 |
| 5,370,305 A | 12/1994 | Schneider | |
| 6,450,201 B1 | 9/2002 | Dieter et al. | |

FOREIGN PATENT DOCUMENTS

| | | |
|---|---|---|
| GB | 886639 | 1/1962 |
| GB | 907226 | 10/1962 |
| GB | 2 119 065 | 11/1983 |

* cited by examiner

*Primary Examiner*—Stephen M. Hepperle
(74) *Attorney, Agent, or Firm*—Young & Thompson

(57) ABSTRACT

A control valve has a valve body and a flow control element preferably in the form of a disc, the valve body defining at least one inlet passage, the inlet passage culminating in an opening which is surrounded at least partially by a flow control surface, and the flow control element is so arranged as to be able to pass close to the flow control surface and across the opening to adjust the flow rate of at least one fluid which is caused to pass through the valve body, wherein the flow control element is constrained within the valve body by a stopping member, the stopping member being adapted to allow a positive clearance to exist between the flow control element and the flow control surface. The stopping member is preferably adjustable, allowing the positive clearance to be adjusted.

10 Claims, 6 Drawing Sheets

CONTROL VALVE

FIELD OF THE INVENTION

Figure 1:
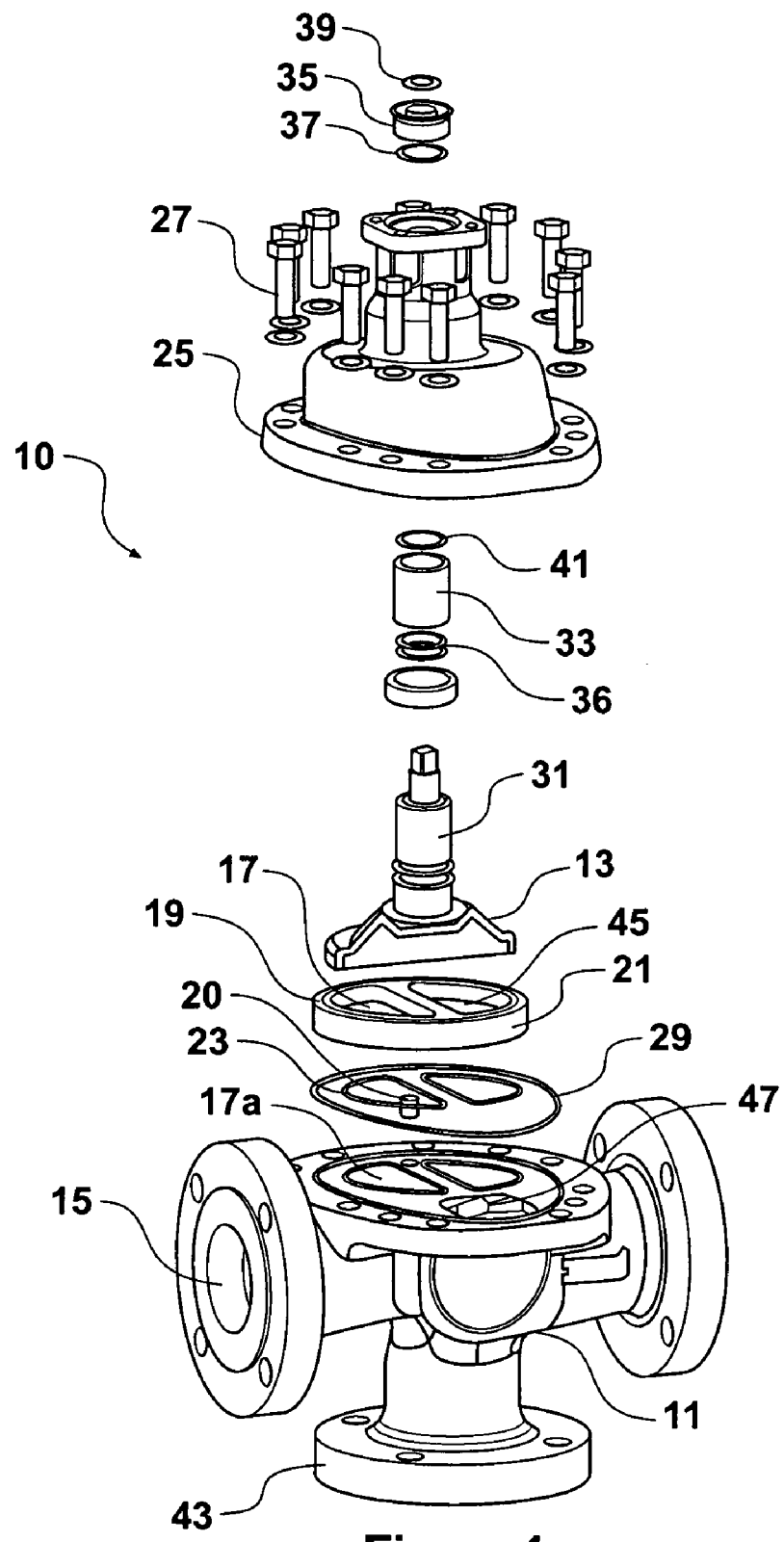

This invention relates to a control valve, and in particular, but not exclusively to a control valve for controlling the mixing or flow rates of fluids.

BACKGROUND

Many industrial processes require the flow rates of fluids to be controlled, or different fluids to be mixed to achieve a desired output parameter. For example, many industrial applications require a flow of water at a particular temperature, and this is often achieved by mixing a flow of hot water with a flow of cold water to achieve a flow at the desired temperature. These processes can typically operate throughout the working day, and in some cases would operate around the clock.

Control valves that are used to control flow rates or fluid mixing in these industrial processes are often required to operate continuously, frequently adjusting the position of valve components to ensure that the desired output parameter is maintained.

Most valves are manufactured to have very close tolerances between the sealing surfaces of the valve components to minimize leakage. Such close tolerances can produce appreciable friction between the sealing surfaces of the valve components, and the friction causes drag when the valve components move relative to one another.

The combination of close tolerances, the associated friction and continuous operation with frequent valve position changes can produce unacceptable levels of wear in the valve components and in the actuators and any gearboxes or mechanisms used to move the valve components.

The drag caused by friction between the valve components can mean that the actuators of the control valves need to be relatively powerful, especially in cases where it is important to control the fluid flow or mixing ratios to a close tolerance and where rapid valve adjustments are required. Similarly gearboxes or other mechanisms used to move the valve components need to be robust to ensure reliability.

Frictional drag can also slow down the response time of a control valve. And similarly the friction and/or "stiction" can reduce the accuracy in positioning the valve's moving components.

Water mixers for hand-basins, showers or baths can also experience these problems.

These factors mean that control valves are often relatively expensive, and they can require maintenance or overhauls at frequencies that are too often. Also, the control valves can have response times that are too slow, and their accuracy as flow controllers or mixing valves can be poor.

OBJECT

It is therefore an object of the present invention to provide a control valve which will go some way towards overcoming the above mentioned problems, or at least provide the public with a useful choice.

STATEMENTS OF THE INVENTION

Accordingly, in a first aspect, the invention may broadly be said to consist in a control valve, comprising a valve body and a flow control means, the valve body defining at least one inlet passage, the inlet passage culminating in an opening which is surrounded at least partially by a flow control surface, and the flow control means is so arranged as to be able to pass close to the flow control surface and across the opening to adjust the flow rate of at least one fluid which is caused to pass through the valve body, wherein the flow control means is constrained within the valve body by a stopping means, the stopping means being adapted to allow a positive clearance to exist between the flow control means and the flow control surface.

In use, the pressure of any fluid entering the control valve can act on the surface of the flow control means which faces the flow control surface, causing the flow control means to move until the stopping means constrains the movement, and in this way the positive clearance will exist when the control valve is in use. Those skilled in the art will appreciate the advantages of having a positive clearance between the primary valve components, that is between the sealing surface and the flow control means, when the valve is in use. The resulting significant reduction in friction between the valve components means that wear is reduced, and the forces required to actuate the valve components are reduced. These factors can lead to reduced actuator and gearbox sizes and corresponding reductions in the total control valve cost. The reduction in wear can mean that the operating life of the control valve is extended. The reduced friction can also mean that the response time of the control can be improved. Similarly, the accuracy of the valve as a controller can be improved as the reduced friction will allow improved precision in the positioning of the flow control means.

While such a control valve design might not be considered ideal as an isolation valve, it is ideally suited to dynamic situations where flows are being continuously controlled, for example between high and low flows for long periods of time. In such circumstances it may be necessary to have a separate isolation valve in series with a control valve as described herein for use at times when it is necessary to shut down the flow completely.

Preferably the stopping means is an adjustable stopping means, that is, a stopping means that will allow the positive clearance to be adjusted. The ability to adjust the positive clearance is advantageous since it allows the valve to be set up at an optimum clearance to suit a particular use for the valve, for example to suit a particular fluid viscosity. The adjustment can also be used to compensate for valve component wear, or for the build up of deposits on the valve component surfaces. In certain applications, for example in a mixing valve, it can be advantageous to be able to minimize the clearance, while still maintaining a clearance, to reduce internal leakage between two inlet sources to an acceptable level.

Preferably the adjustable stopping means includes a threaded device which cooperates with a mating thread associated with the valve body, such that rotation of the threaded device adjusts the positive clearance.

Preferably a locking means is provided to lock the position of the adjustable stopping means.

Preferably the flow control means is connected to a spindle, and the stopping means acts to constrain the spindle in at least one direction.

Preferably the positive clearance is in the range of 0.02 to 0.5 millimetres, but clearly positive clearances outside of this range may be appropriate in some circumstances, for example in a control valve used to control the flow of a slurry, where a positive clearance of 3 to 5 millimetres could be appropriate.

More preferably the positive clearance is in the range of 0.03 to 0.2 millimetres.

And yet more preferably the positive clearance is in the range of 0.04 to 0.08 millimetres.

While the flow control means can have a variety of shapes, for example the shape of an incomplete spherical or cylindrical shape, preferably the flow control means is a substantially planar member in the shape of an incomplete disc, for example in the shape of a disc with a missing sector shaped portion where the apex of the sector shape is adjacent to the centre of the disc shape.

More preferably the flow control means has the shape of an incomplete disc that is substantially semi-circular in shape.

Preferably the flow control surface is a surface on an item which is separate from the valve body, but which mates with the valve body, for example the flow control surface could be a surface on a fixed disc, as used in many disc valves. Such a configuration provides a replaceable flow control surface, eliminating the need to repair or replace any part of the valve body due to wear or other damage on the flow control surface.

Preferably the control valve includes an actuator which is operably connected to the flow control means and can be used to cause the flow control means to move.

Preferably the actuator is a stepping motor, but clearly the actuator could be chosen from a number of options, for example a DC motor, or a hydraulic or a pneumatic actuator.

Preferably the control valve includes a system controller which is adapted to control the positioning of the flow control means.

Preferably the control valve includes a feedback means adapted to monitor at least one parameter of the fluid flowing out of the valve. Such information can be fed back to the system controller of the control valve.

Optionally the valve body defines two inlet passages and the control valve is adapted to control the mixing of two fluids. Such a valve could for example be used to mix hot and cold water to produce a flow of water at a specified intermediate temperature.

In a second aspect, the invention may broadly be said to consist in an industrial processing plant incorporating at least one control valve as specified herein.

In a third aspect, the invention may broadly be said to consist in a domestic mixing valve incorporating at least one control valve as specified herein, for example a kitchen, shower, hand-basin or bath mixing valve.

DESCRIPTION

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

Figure 2:
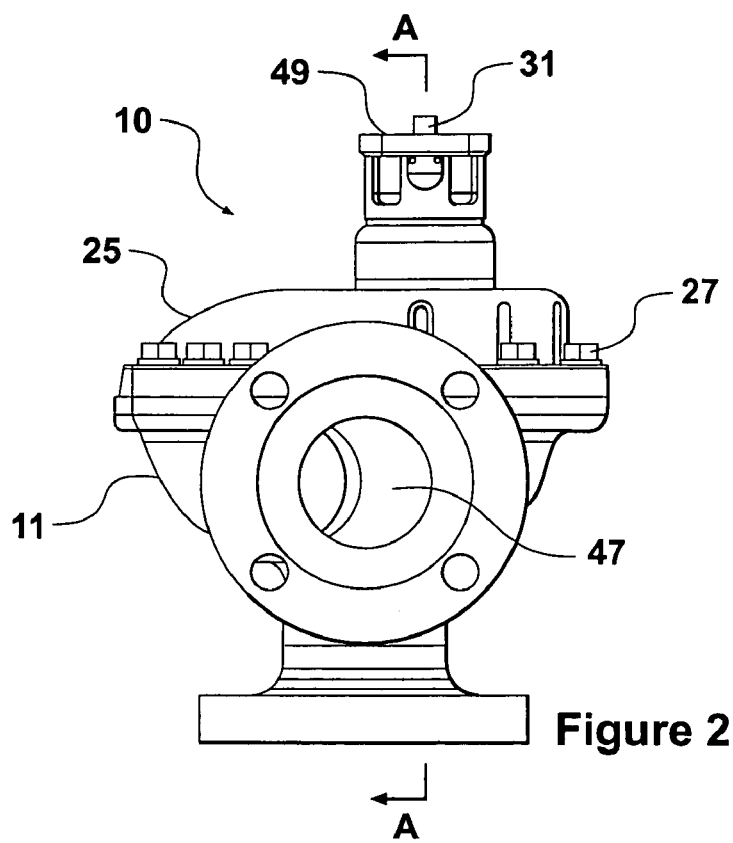
Figure 3:
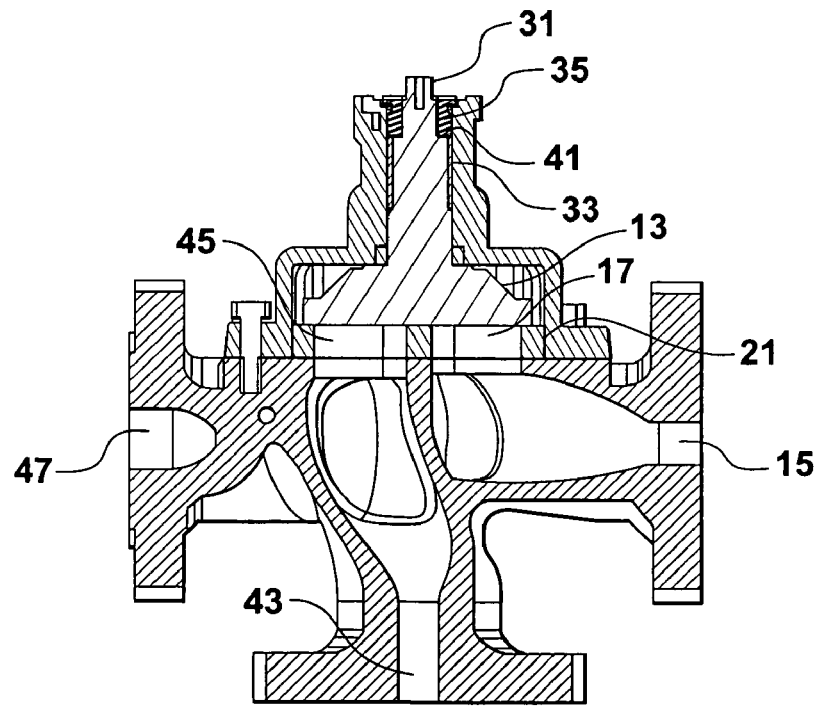
Figure 4:
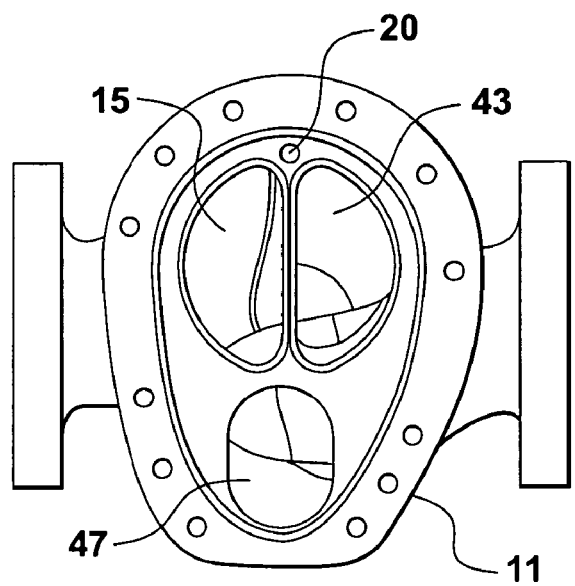
Figure 5:
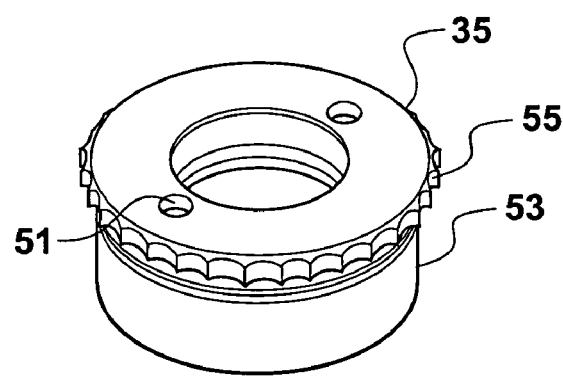
Figure 5A:
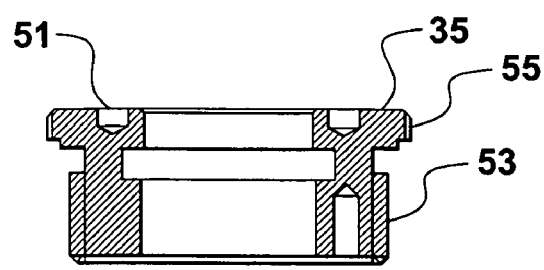
Figure 6:
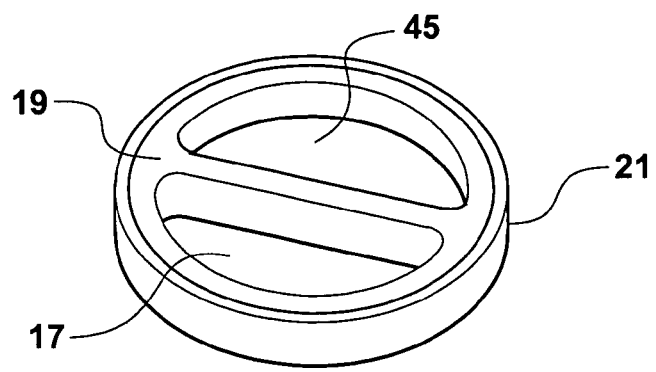
Figure 6A:
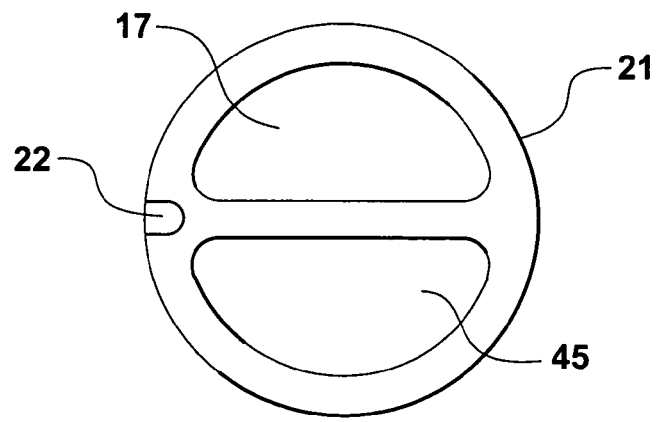
Figure 7:
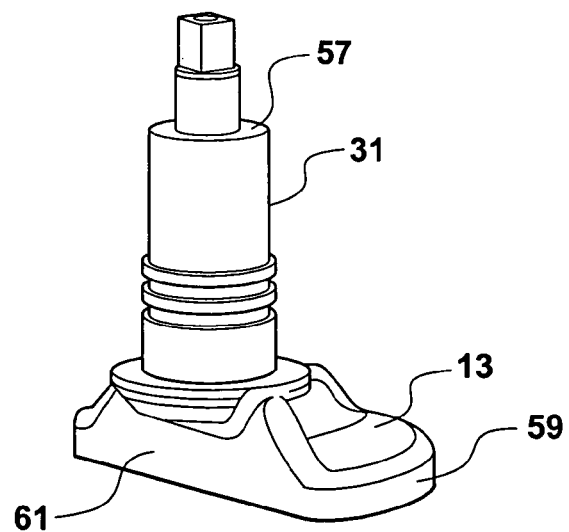
Figure 8:
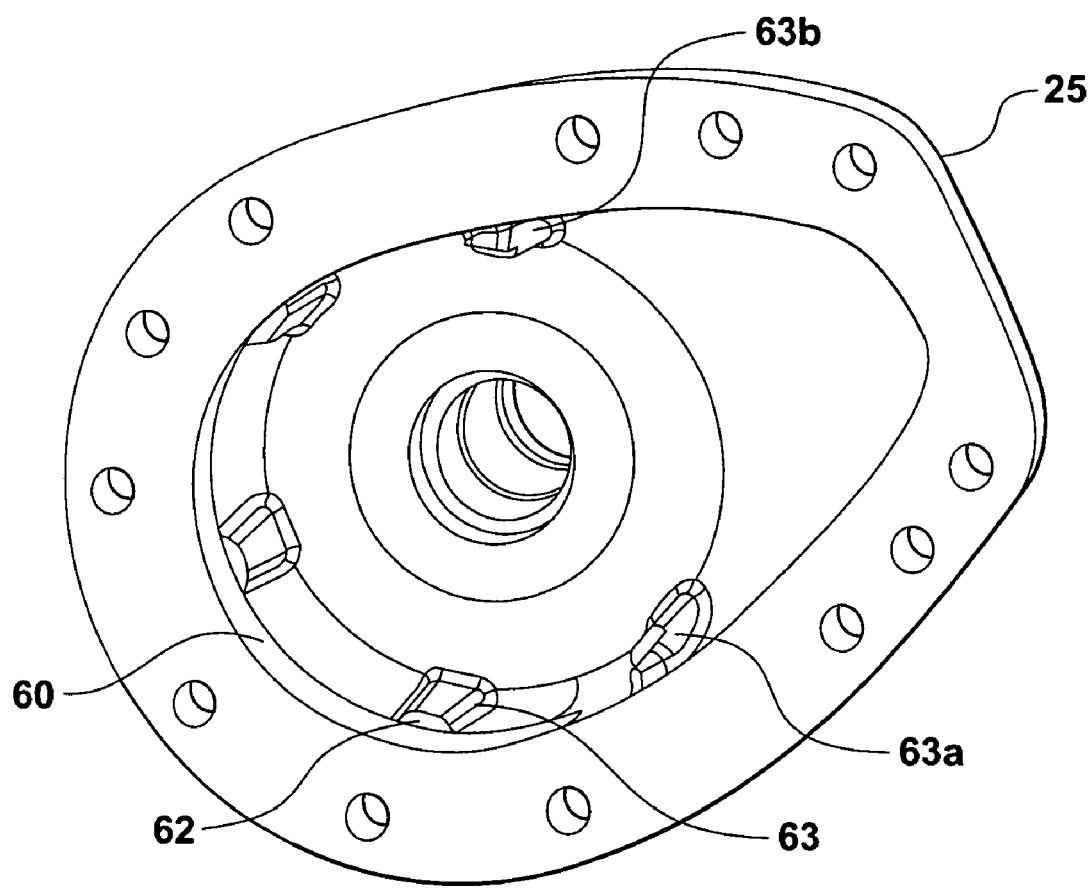
Figure 9:
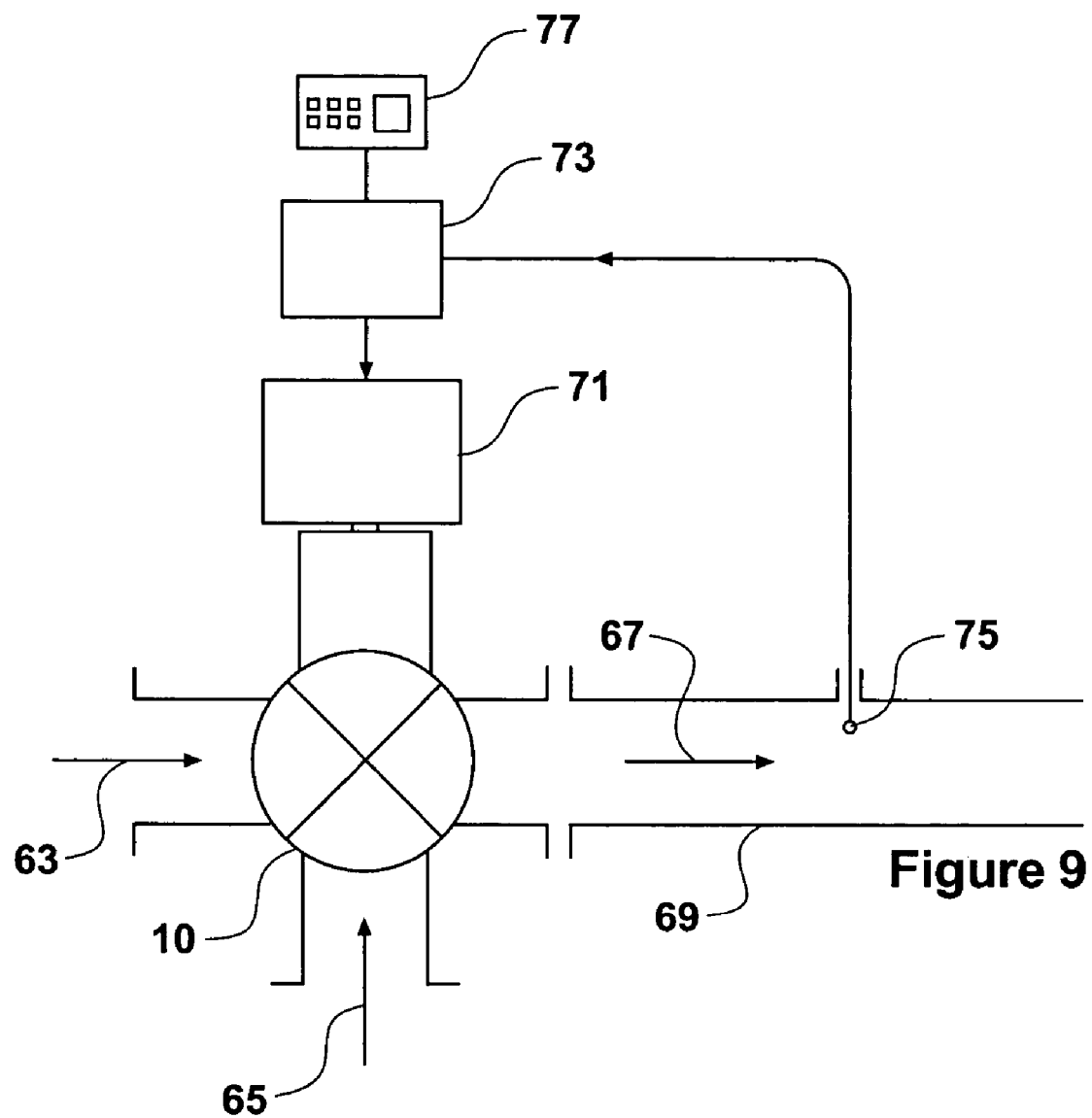

One preferred form of the invention will now be described, by way of example only, with reference to the accompanying drawings in which, FIG. 1 is a perspective exploded view of a control valve, FIG. 2 is a side elevation of the control valve assembled, FIG. 3 is a cross sectional view of the control valve shown in FIG. 2, FIG. 4 is a plan view of the main valve body component, FIG. 5 is a perspective view of an adjustment nut, FIG. 5a is a cross sectional view of the adjustment nut, FIG. 6 is a perspective view of a fixed disc, FIG. 6a is a bottom plan view of the fixed disc, FIG. 7 is a perspective view of a combination spindle and disc, or a "spindle-disc", FIG. 8 is a perspective view showing the internal geometry of a bonnet, and FIG. 9 is a schematic diagram showing the control valve and an actuator integrated into a feed back control system.

With reference to FIG. 1, a control valve (10) is shown comprising at least a main valve body (11) and a flow control means (13). In this case the flow control means (13) is in the form of an incomplete disc having a semi-circular shape. The main valve body (11) defines a first inlet passage (15) which culminates in a first opening (17). A flow control surface (19) is shown on one surface of a fixed disc (21). Fluid flow control is achieved by a shearing motion of the flow control means (13) across the first opening (17).

When the control valve (10) is assembled the fixed disc (21) is mated in sealing contact with the valve body (11), an o-ring (23) being used to improve the seal. The fixed disc (21) is provided with a recess (22) which engages with a pin (20) which is located in the main valve body (11) and protrudes sufficiently to engage with the recess (22). The recess (22) is not shown in this figure, but is shown with reference to FIG. 6a below. The pin (20) prevents rotation of the fixed disc (21) relative to the main valve body (11).

The valve body is made complete when the bonnet (25) is secured to the main valve body (11) using the bolts (27), and a seal is achieved between the main valve body (11) and the bonnet (25) using an o-ring (29). The internal geometry of the bonnet (25) is adapted to further restrain the fixed disc (21), these features are described with reference to FIG. 8 below.

The flow control means (13) is attached to a spindle (31) and the spindle (31) is constrained within the bonnet (25) portion of the valve body primarily by a bushing (33) and an adjustment nut (35). The adjustment nut (35) is adapted to form an adjustable stopping means which limits movement of the spindle (31) in an axial direction, and adjustment of the position of the adjustment nut (35) relative to the bonnet (25) adjusts the maximum extent of axial movement of the spindle (31) away from the fixed disc (21). It is contact of the flow control means (13) with the fixed disc (21) which limits axial movement of the spindle (31) in the opposite direction, that is, towards the fixed disc (31). In use, pressure of any fluids entering the inlet passage (15) acts to push the flow control means (13) and the spindle (31) toward the adjustment nut (35) so that in use a positive clearance is achieved between the flow control means (13) and the fixed disc (21).

The adjustment nut (35) has an external threaded portion which engages with a mating thread in the bonnet (25). It is rotation of the adjustment nut (35) whilst the threaded portion is engaged with the mating thread in the bonnet (25) which can be used to adjust the position of the adjustment nut (35) relative to the bonnet (25) and thereby control the maximum limit of the positive clearance between the flow control means (13) and the flow control surface (19).

It is this positive clearance that is key to the present invention. The positive clearance allows fluid pressure to enter the clearance gap between the flow control means (13) and the flow control surface (19) and to exert a force to keep the two apart. The reduced or eliminated contact almost completely eliminates friction between the flow control means (13) and the flow control surface (19), albeit at the expense of some minor fluid leakage through the gap. In many flow control applications however this internal leakage is of little or no consequence especially where continuous flow of a fluid is required, and it is only the flow rate that needs to be controlled. This is true in many flow control and fluid mixing applications.

The reduced friction has a number of advantages which are detailed as follows;
Reduced wear of the flow control means (13) and the flow control surface (19),
Reduced actuator and gearbox torque requirements,
Improved valve response times,
Improved accuracy of control.

In practice the positive clearance can be initially set up by turning the adjustment nut (35) until the flow control means (13) is brought into contact with the flow control surface (19), and then to turn the adjustment nut (35) back a set amount. A desired positive clearance of approximately 0.06 millimetres or 0.602 inches has been found to work well in valves used to control water flow.

Due to manufacturing tolerances and surface finishes it is likely that some high spots on the flow control means (13) will contact similar high spots on the flow control surface (19) when a positive clearance of 0.06 millimetres or similar is initially set up. However experience has shown that these high spots will soon wear away during an initial running-in period, and then the valve will operate with almost zero contact between the flow control means (13) and the flow control surface (19) during normal operation.

O-rings (36), (37) and (39) are used to achieve a seal between the spindle (31), the bonnet (25) and the adjustment nut (35). A thrust washer (41) carries thrust loads between the spindle (31) and the adjustment nut (35), and is adapted to reduce friction between the two as the spindle (31) rotates. These thrust loads are generated primarily from the pressure of any fluids which are contained within or passing though the main valve body (11) and which act against the face of the flow control means (13) which faces the first opening (17).

The control valve (10) shown in FIG. 1 is in fact a mixing valve. In addition to the first inlet passage (15) the valve body (11) also includes a second inlet passage (43), which culminates in a second opening (45). In use cold water can be supplied to the first inlet passage (15) and hot water supplied to the second inlet passage (43), for example. The flow control means (13) is able to influence or control the flow of a fluid through each inlet passage (15) and (43), the combined fluid flow is then mixed as it travels through the chamber created by the bonnet (25) and as the fluids pass out of the valve body (11) through an outlet passage (47).

Both the first and the second openings (17) and (45) are semi-circular in shape, and the flow control means (13) is shaped and sized such that it is able to completely cover one opening (17) or (45) while at the same time not covering the other opening (45) or (17) at all. Such a configuration of openings (17) and (45) provides very efficient use of the space within the control valve (10), and provides a shear disc valve arrangement of minimum diameter for a given desired flow rate. Minimising the diameter produces significant advantages in reducing the torque requirements of an actuator which can be used to position the flow control means (13).

In the control valve (10) shown, the flow control surface (19) is a flat surface on one side of the removable fixed disc (21). Clearly the control surface (19) could optionally be a surface on the main valve body (11). However, having the flow control surface (19) on a removable fixed disc (21) provides the advantage of simplified maintenance or repair should the flow control surface (19) become worn or damaged.

With reference to FIG. 2, the control valve (10) is shown in an assembled state, and oriented such that the outlet passage (47) faces the viewer. In the assembled state the bonnet (25) is fastened to the main valve body (11) using the bolts (27).

The free end of the spindle (31) can be seen protruding above a mounting face (49). This mounting face (49) can be used to mount an actuator, which can be operably connected to the spindle (31). This arrangement is discussed in further detail with reference to FIG. 8 below.

With reference to FIG. 3, the assembled control valve (10) is shown in cross section, the location of the cross section A-A being indicated in FIG. 2. In this cross section the arrangement of the inlet passages (15) and (43) and their respective openings (17) and (45) can be clearly seen. A portion of the outlet passage (47) can also be seen.

In this example the spindle (31) is formed as a single unit with the flow control means (13). The combined spindle (31) and flow control means (13) are constrained within the bonnet (25) by the bushing (33) and the adjustment nut (35). The thrust washer (41) is situated between a shoulder on the spindle (31) and one face of the adjustment nut (35).

With reference to FIG. 4, the main valve body (11) is shown in plan view. In this view the arrangement and geometry of the first and second inlet passages (15) and (43) adjacent to the first and second openings (17) and (45) can be seen. The location of the pin (20) can also be seen.

With reference to FIGS. 5 and 5a, the adjustment nut (35) is shown in a perspective and a cross sectional view. The upper surface of the adjustment nut (35) contains two bores (51) which are used to engage with a pin spanner for installation and removal. An external thread (53) on the side of the adjustment nut (35) is used to engage with a mating thread in the bonnet (25). Around the periphery of the adjustment nut (35) are a continuous series of notches (55), which are used to engage with a locking screw (not shown).

When the adjustment nut (35) has been adjusted to produce the desired positive clearance between the flow control means (13) and the flow control surface (19), the adjustment nut (35) can be locked in place by a locking screw which engages with a mating thread in the bonnet (25) and also engages with one of the notches (55) to prevent rotation of the adjustment nut (35).

In the control valve (10) of the present example, rotation of the adjustment nut (35) by one notch (55) equates to a change in the desired positive clearance between the flow control means (13) and the flow control surface (19) of approximately 0.03 millimetres.

With reference to FIGS. 6 and 6a, the fixed disc (21) is shown in perspective in FIG. 6 and the surface of the fixed disc (21) which mates with the main valve body (11) is shown in FIG. 6a. In these figures the "D" shaped or semi-circular openings (17) and (45) are clearly shown.

The upper surface of the fixed disc (21) shown in FIG. 6 is the flow control surface (19).

The lower surface of the fixed disc (21) shown in FIG. 6a contains a recess (22) which engages with the pin (20) which is located in the main valve body (11). The engagement of the recess (22) with the pin (20) prevents the fixed disc from rotating relative to the main valve body (11). The fixed disc is further restrained by the geometry of the bonnet (25), this is described with reference to FIG. 8 below.

With reference to FIG. 7, the combined spindle (31) and flow control means (13) is shown. The spindle (31) has a shoulder (57) which bears against the thrust washer (41) in the assembled control valve (10). The thrust washer (41)

bears against the adjustment nut (35), transferring compression loads between the spindle (13) and the adjustment nut (35).

In this example the flow control means (13) is in the form of an approximately semi-circular disc having a flat surface (61) aligned with or close to a diameter of the disc shape, and a curved surface (59) aligned with the diameter of the disc shape. The cylindrical centre-line of the curved surface (59) of the disc shape is coaxial with the centre-line of the spindle (31), and the flat surface (61) passes through, or adjacent to, the centre-line of the spindle (31).

With reference to FIG. 8, the geometry of the interior of the bonnet (25) is explained in further detail. The bonnet (25) is provided with a partial bore (60), which is adapted to engage with the outer diameter of the fixed disc (21) to constrain the fixed disc (21) radially, and shoulders (62) on each of the lugs (63), which are adapted to engage with the shoulders of the fixed disc (21) to constrain the fixed disc (21) axially. It is important to note that the partial bore (60) is present on the two lugs (63*a*) and (63*b*) as well as on the main body of the bonnet (25), and in this way the partial bore (60) extends beyond 180 degrees and is therefore able to constrain the fixed disc (21) radially in all directions. As explained with reference to FIGS. 1 and 6*a* the pin (20) prevents rotation of the fixed disc (21) relative to the main valve body (11). In this way the fixed disc (21) is fully restrained.

With reference to FIG. 9, the control valve (10) is shown having two fluid inflows, fluid A (64) and fluid B (65), the resulting output fluid (67) from the control valve (10) being a fluid comprising a combination of fluids A and B. The output fluid (67) is shown passing through a pipe (69) which is connected to the outlet port of the control valve (10).

In this diagram the control valve (10) is shown including an actuator (71), and a system controller (73), the actuator (71) being adapted to position the flow control means in the control valve (10) in response to inputs from the system controller (73). The system controller (73) receives data regarding the output fluid (67) from a sensor (75), and compares it with a desired output fluid parameter from a controller input device (77). The system controller (73) directs the actuator (71) to reposition the flow control means if necessary to achieve the desired output fluid parameter.

The schematic diagram of FIG. 9 shows the sensor (75) being located in the pipe (69). Another optional configuration is to position the sensor (75) in the outlet passage (47) of the main valve body (11). Clearly an advantage of this option is that installation of the control valve (10) would be simplified, in that the control valve (10) is then complete with an integrated sensor (75).

Preferably the system controller (73) is a microprocessor based controller and the actuator (71) is a stepping motor. However, clearly the advantages of the present invention can be exploited using a range of system controller and actuator combinations.

Variations

The invention has been described with reference to disc valves, but those skilled in the art would appreciate that the same principles could be adapted to a range of valve designs, for example, spherical valves and slide valves.

Definitions

The term "positive clearance" used herein is intended to mean a clearance between two opposing surfaces, as opposed to "contact" or "interference" between two opposing surfaces. Due to manufacturing tolerances and surface finishes there may be some contact over a minority of the area between the two opposing surfaces that are separated by a "positive clearance", however the term indicates that a clearance exists over the majority of the area between the two opposing surfaces. A "positive clearance" will allow a fluid under pressure to flow between the two opposing surfaces to such an extent that at least a portion of the pressure present in the fluid will be felt over the majority of the area between the two opposing surfaces.

The term "spindle-disc" used herein is intended to mean a control valve component comprising both a spindle and at least a portion of a disc.

Throughout this specification the word "comprise" and variations of that word, such as "comprises" and "comprising", are not intended to exclude other additives, components, integers or steps.

The invention claimed is:

1. A control valve comprising a valve body and a flow control means, the valve body defining at least one inlet passage, the inlet passage culminating in an opening which is surrounded at least partially by a flow control surface, and the flow control means is so arranged as to be able to pass close to the flow control surface and across the opening to adjust the flow rate of at least one fluid which can pass through the said inlet passage, and the flow control means is constrained in a manner allowing allow a positive clearance to exist between the flow control means and the flow control surface, wherein the maximum extent of the positive clearance is determined by an adjustable stopping means which is movable relative to the valve body.

2. A control valve as claimed in claim 1, wherein the adjustable stopping means includes a threaded device which cooperates with a mating thread associated with the valve body, such that rotation of the threaded device adjusts the positive clearance.

3. A control valve as claimed in claim 1, wherein a locking means is provided to lock the position of the adjustable stopping means.

4. A control valve as claimed in claim 1, wherein the flow control means is connected to a spindle, and the stopping means acts to constrain the spindle in at least one direction.

5. A control valve as claimed in claim 1, wherein the positive clearance is in the range of 0.02 to 0.5 millimetres.

6. A control valve as claimed in claim 1, wherein the flow control means is a substantially planar member in the shape of an incomplete disc.

7. A control valve as claimed in claim 6, wherein the flow control means has the shape of an incomplete disc that is substantially semi-circular in shape.

8. A control valve as claimed in claim 1, wherein the control valve includes an actuator which is operably connected to the flow control means and can be used to cause the flow control means to move.

9. A control valve as claimed in claim 1, wherein the valve body defines two inlet passages and the control valve is adapted to control the mixing of two fluids.

10. A domestic mixing valve incorporating at least one control valve as claimed in claim 1.

* * * * *